Figure 1:
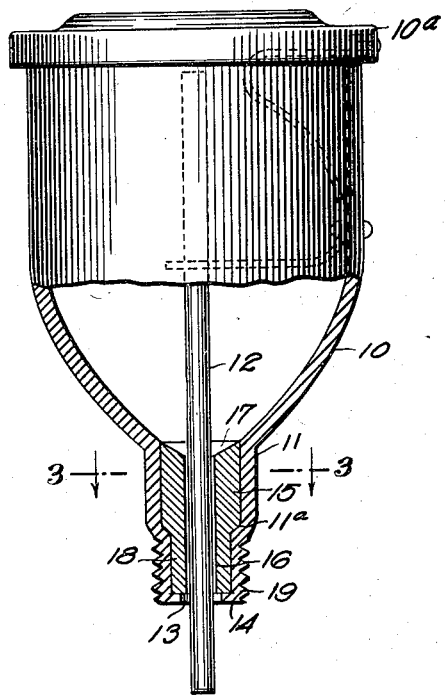

T. O. ORGAN.
GREASE CUP.
APPLICATION FILED NOV. 4, 1915.

1,190,188.

Patented July 4, 1916.

WITNESSES

INVENTOR
Thomas Opie Organ
BY
ATTORNEYS

UNITED STATES PATENT OFFICE.

THOMAS OPIE ORGAN, OF PHILADELPHIA, PENNSYLVANIA.

GREASE-CUP.

1,190,188.   Specification of Letters Patent.   Patented July 4, 1916.

Application filed November 4, 1915. Serial No. 59,540.

*To all whom it may concern:*

Be it known that I, THOMAS OPIE ORGAN, a citizen of the United States, and a resident of Philadelphia, in the county of Philadelphia and State of Pennsylvania, have invented a new and Improved Grease-Cup, of which the following is a full, clear, and exact description.

My invention relates more particularly to grease cups of the pressed metal type. In cups of this type the tubular shank, by means of which the cup is secured to the bearing to be lubricated, is required to be made of a size to suit the bearing. The result is that a comparatively large outlet opening is formed for the lubricant, the opening being defined by the inner walls of the shank of the cup, so that when using a light body of semi-solid lubricant in situations where the vibration is considerable or the density of the lubricant is likely to be changed by heat above that of the atmosphere, the lubricant flows too freely from the cup.

The prime object of my invention is to overcome this serious objection by providing means in connection with the cup whereby the flow of the lubricant will be retarded should the cup and bearing be subjected to excessive vibration or should the cup be subjected to higher temperature than that of the atmosphere so as to cause the lubricant to thin down.

In carrying out my invention I provide within the shank of the cup a tubular retarder of soft metal supported in the shank of the cup and having a bore forming a constricted outlet for the flow of the lubricant.

The invention will be particularly explained in the specific description following.

Reference is to be had to the accompanying drawings forming part of this specification in which similar reference characters indicate corresponding parts in all the views.

Figure 2:
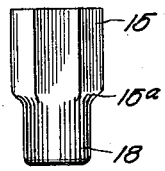
Figure 3:
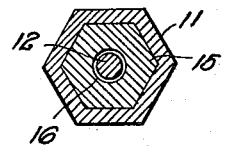

Figure 1 is a sectional side elevation of a grease cup embodying my invention; Fig. 2 is a side elevation of the retarder; and Fig. 3 is a cross section on the line 3—3, Fig. 1.

The cup 10, as illustrated, is, in general, similar to a known form of pressed metal cups having a cover $10^a$ secured by any suitable means and formed with an integral tubular shank 11 threaded to connect with the bearing to be lubricated.

The numeral 12 indicates the usual copper rod extending vertically in the lubricator and through the shank thereof into the bearing, whereby to conduct the lubricant to the bearing.

The outlet orifice 13 of the shank 11 is, in the present instance, defined by an annular inturned flange 14 at the lower end of the shank. Within the shank 11 I provide a tubular retarder 15, the bore of which is of smaller diameter than that of the orifice 13 but sufficiently large to accommodate the conducting rod 12 and provide an annular space around the latter for the passage of the lubricant along the rod between the same and the walls of the said bore 16. The lower threaded portion 19 of the shank 11 is preferably contracted to provide an internal shoulder $11^a$, the lower end 18 of the retarder being reduced to correspond with the formation of the shank and present a shoulder $15^a$ to rest on the shoulder $11^a$. The upper end of the retarder 15 has a depression 17 converging inwardly to the bore 16, the outer edge of the depression 17 being in line with the tapering inner walls of the cup 10 so that the upper surface of the retarder will form practically a continuation of the inner surface of the cup.

By the use of my improved retarder a too free flow of the lubricant will be prevented even under excessive vibration or when the lubricant is subjected to heat. On the other hand, however, in situations where the lubricant will be subjected to a low temperature such as to prevent a ready flow thereof, the retarder may be removed and the tubular shank 11, with its outlet 13, utilized for the discharge of the lubricant. Thus, a cup equipped with my invention provides for regulating the feed of the lubricant according to the conditions of temperature, vibration and other factors affecting the flow of the lubricant.

Having thus described my invention I claim as new, and desire to secure by Letters Patent:

1. A grease cup having a shank thereon, said shank having means whereby to secure the cup in position, and a tubular retarder fitted in the said shank and independent of said securing means, said retarder having a bore smaller than the outlet of the said shank.

2. A grease cup having a shank thereon, said shank having means whereby to secure the cup in position, and a tubular retarder removably fitting the shank of the cup and formed with a bore smaller than the outlet of the said shank, said retarder being independent of the said securing means.

3. A grease cup having a tubular retarder fitted in the shank thereof, the retarder having a bore smaller than the outlet of the said shank, the upper end of the retarder having a depression flaring from the bore of said retarder to correspond with the taper of the body of the cup.

4. A grease cup having an inturned annular flange at the lower end defining the outlet of the shank and a tubular retarder in said shank, said retarder having a bore smaller than the outlet of the shank.

5. A grease cup having an inturned annular flange at the lower end defining the outlet of the shank, the shank being formed with a lower portion of reduced diameter presenting an interior shoulder above said flange, and a tubular retarder in said shank, the retarder having a bore smaller than the outlet of the shank and having a reduced lower portion presenting a shoulder conforming to the shoulder on the shank.

6. A grease cup having a tubular retarder fitted in the shank thereof, said retarder having a bore smaller than the outlet of the said shank, said shank having attaching threads on the outer surface thereof.

7. A grease cup having a tubular retarder removably fitting the shank of the cup and formed with a bore smaller than the outlet of the said shank, said shank having attaching threads on the outer surface thereof.

In testimony whereof I have signed my name to this specification in the presence of two subscribing witnesses.

THOMAS OPIE ORGAN.

Witnesses:
DUGALD S. PATERSON,
WARREN F. BUZBY.

Copies of this patent may be obtained for five cents each, by addressing the "Commissioner of Patents, Washington, D. C."